(12) United States Patent
Minakuchi (10) Patent No.: US 8,531,680 B2
(45) Date of Patent: Sep. 10, 2013

(54) METHOD OF DETECTING THE WIDTH OF A COATED FILM AND DETECTION DEVICE USED IN SAID DETECTION METHOD

(75) Inventor: Akio Minakuchi, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 267 days.

(21) Appl. No.: 13/140,037

(22) PCT Filed: Jan. 15, 2009

(86) PCT No.: PCT/JP2009/050483
§ 371 (c)(1),
(2), (4) Date: Jun. 16, 2011

(87) PCT Pub. No.: WO2010/082335
PCT Pub. Date: Jul. 22, 2010

(65) Prior Publication Data
US 2011/0249276 A1 Oct. 13, 2011

(51) Int. Cl.
*G01B 11/02* (2006.01)

(52) U.S. Cl.
USPC .......................................................... 356/635

(58) Field of Classification Search
None
See application file for complete search history.

(56) References Cited

U.S. PATENT DOCUMENTS

2003/0017256 A1    1/2003  Shimane

FOREIGN PATENT DOCUMENTS

| JP | 2002-257506 | 9/2002 |
|----|-------------|--------|
| JP | 2002-373843 | 12/2002 |
| JP | 2004-286589 | 10/2004 |
| JP | 2005-131500 | 5/2005 |
| JP | 2005-230683 | 9/2005 |
| JP | 2006-71625  | 3/2006 |
| JP | 2006-167620 | 6/2006 |
| JP | 2007-289865 | 11/2007 |
| JP | 2008-36607  | 2/2008 |

OTHER PUBLICATIONS

International Search Report in International Application No. PCT/JP2009/050483; Mailing Date: May 12, 2009.

*Primary Examiner* — Gregory J Toatley
*Assistant Examiner* — Amanda Merlino
(74) *Attorney, Agent, or Firm* — Finnegan, Henderson, Farabow, Garrett & Dunner, LLP (57) ABSTRACT

A method for inspecting the width of a coated film in accordance with the present disclosure is a method for detecting a width W1 of a coated film 20, the method including: a step of measuring a thickness profile in the transverse direction of the coated film 20; a step of creating approximating curves L1, L2 of a function of a distance X and a thickness Y in end-proximal regions 24a, 24b of both ends of the coated film 20; and a step of taking a distance $X_{e1}$ corresponding to a thickness threshold $Y_t$ determined from the approximating curve L1 of one end-proximal region 24a and a distance $X_{e2}$ corresponding to the thickness threshold $Y_t$ determined from the approximating curve L2 of the other end-proximal region 24b, and of calculating $X_{e1}-X_{e2}$ as the width W1.

8 Claims, 5 Drawing Sheets

METHOD OF DETECTING THE WIDTH OF A COATED FILM AND DETECTION DEVICE USED IN SAID DETECTION METHOD

CROSS-REFERENCE TO RELATED APPLICATIONS

This application is a national phase application of International Application No. PCT/JP2009/050483, filed Jan. 15, 2009, the contents of which are incorporated herein by reference.

TECHNICAL FIELD

The present invention relates to a method for detecting a width of a coated film that is formed on an elongated sheet-like substrate along the longitudinal direction of the substrate, the width being detected in a transverse direction intersecting this longitudinal direction, and to an inspection device used in the inspection method.

BACKGROUND ART

The importance of lithium ion batteries, nickel hydride batteries and other secondary batteries as power sources to be carried on vehicles or power sources for personal computers and portable terminals has grown in recent years. In particular, lightweight lithium ion batteries that make it possible to obtain a high energy density are expected to be advantageously used as high-output power sources to be carried on vehicles.

A battery structure including a wound electrode body having a spirally wound structure is known as a typical configuration of a lithium ion battery. The wound electrode body is constituted by sheet-like electrodes (sheet-like positive electrode and sheet-like negative electrode) and a sheet-like separator and manufactured by laminating the sheets and winding the laminate. The sheet-like electrodes for the lithium ion battery have a configuration in which an electrode active material layer including an electrode active material is formed on one or both surfaces of a sheet-like substrate made from a metal. The sheet-like electrode is provided with an uncoated portion (a portion where the electrode active material layer has not been formed and the surface of the sheet-like substrate is exposed) in part thereof, and an electrode lead (current-collecting foil or the like) is attached to the uncoated portion.

For example, a method by which an electrode active material layer is coated as a continuous stripe pattern with a predetermined spacing in the longitudinal direction of a sheet-like substrate is known as a coating method providing an uncoated portion on the sheet-like electrode. A coating means such as a die coater can be advantageously used for such a coating method. For example, a method is used by which a die is disposed in a convening path of the sheet-like substrate to coat the electrode active material layer. The conventional methods for measuring the thickness (height) of the coated film are disclosed in Patent Documents 1 and 2.

Patent Document 1: Japanese Patent Application Publication No. 2002-257506

Patent Document 2: Japanese Patent Application Publication No. 2006-71625

However, the problem associated with the sheet-like electrode coated by the above-described die-coater or the like is that the thickness of the electrode active material layer can easily become uneven at the boundary of the electrode active material layer and the uncoated portion. Thus, when the electrode active material layer is coated on the substrate, a coating liquid drip occurs at the coating end portion of the electrode active material layer, and even if the die shape or viscosity of the coating liquid is adjusted, the thickness in the transverse direction is still uneven and the thickens of the coating portion of the electrode active material layer tends to be less than that in the coating center portion. In the coating end portion of the electrode active material layer where the thickness has decreased, the coating weight per unit surface area (coating amount) decreases and therefore unsuitable coated portions that do not have the required coating weight can be obtained. The capacity of a lithium ion secondary battery is increases by efficiently packing the electrode active material in as large an amount as possible into the limited inner space of the battery. Therefore, it is important that the occurrence of such unsuitable coated portions that do not have the required coating weight be prevented and the coating width (yield of electrode active material) be managed.

DISCLOSURE OF THE INVENTION

The present invention has been created with the foregoing in view, and it is an object of the present invention to provide a method for inspecting the width of a coated film by taking the coating weight (coating amount) of the coated film into account, this method being designed for detecting a width of a coated film that is formed on an elongated sheet-like substrate along the longitudinal direction of the substrate, the width being detected in a transverse direction intersecting this longitudinal direction. It is another object of the present invention to provide a device for inspecting the width of a coated film that can advantageously realize such method for inspecting the width of the coated film.

The method provided by the present invention is a method for detecting a width of a coated film that is formed on an elongated sheet-like substrate along a longitudinal direction of the substrate, the width being detected in a transverse direction intersecting this longitudinal direction, the method including the steps of: (a) measuring a thickness profile in the transverse direction of the coated film at a predetermined measurement point in the longitudinal direction, the thickness profile being defined as a thickness Y of the coating film from a reference point $Y_0$ relating to the thickness, with respect to a distance X in the transverse direction from a reference point $X_0$ relating to the width; (b) creating approximating curves of a function of the distance X and the thickness Y in end-proximal regions of both ends of the coated film in the transverse direction, on the basis of the measured thickness profile; and (c) taking, as the both ends in the transverse direction, a distance $X_{e1}$ corresponding to a thickness threshold $Y_t$ determined from the approximating curve of one end-proximal region and a distance $X_{e2}$ corresponding to a thickness threshold $Y_t$ determined from the approximating curve of the other end-proximal region on the basis of the approximating curves obtained for the end-proximal regions of the both ends in the transverse direction and a thickness threshold $Y_t$ from the reference point $Y_0$ that has been set in advance, and calculating an absolute value of a difference between $X_{e1}$ and $X_{e2}$, that is, $X_{e1}-X_{e2}$, as a width of the coated film in the transverse direction at the predetermined measurement point.

With such an inspection method, when detecting a width of the coated film in a transverse direction intersecting the longitudinal direction of the elongated sheet-like substrate on which the coated film is formed along the longitudinal direction of the substrate, the width of the coated film in the transverse direction can be calculated by subtracting the unsuitable coated portions in which the desired coating weight is not obtained for the end-proximal regions of the both ends in the transverse direction. Therefore, the width of the coated film in the transverse direction taking the coating weight into account can be obtained. As a result, a shape value of the coated width can be advantageously used, for example, for quality control or coating process estimation of the coating film.

In a preferred mode of the method disclosed herein, the thickness profile is measured at a predetermined measurement point on a path in which the elongated sheet-like substrate on which the coated film is formed along the longitudinal direction is conveyed with a predetermined roller, and a surface of the roller that is in contact with the sheet-like substrate is set to the reference point $Y_0$ relating to the thickness. With such an inspection method, the surface of the roller that changes little in position during measurements is set to the reference point $Y_0$ relating to the thickness. Therefore, even when wrinkles or twists occur on the substrate surface, the width of the coated film can be calculated with good precision (stably) unaffected by the wrinkles or twists.

In the preferred mode of the method disclosed herein, the measurement of the thickness profile is performed when the coated film formed on the substrate is in a wet state prior to drying. With such an inspection method, the width of the coated film in the transverse direction taking the coating weight into account can be calculated with good precision (stably).

In the preferred mode of the method disclosed herein, the measurement of the thickness profile is performed using a laser displacement sensor, while conducting irradiation with a laser along the transverse direction of the coated film at the predetermined measurement point. With such an inspection method, the measurement of the thickness profile can be performed in a contactless manner.

The present invention also provides a device for inspecting the width of a coated film that can advantageously realize the above-described method for inspecting the width of a coating film. This device detects a width of a coated film that is formed on an elongated sheet-like substrate along the longitudinal direction of the substrate, the width being detected in a transverse direction intersecting this longitudinal direction, and the device includes: a thickness profile measurement unit that measures a thickness profile in the transverse direction of the coated film at a predetermined measurement point in the longitudinal direction, and a control unit connected to the thickness profile measurement unit. The control unit is configured: to create approximating curves of a function of the distance X and the thickness Y in end-proximal regions of both ends of the coated film in the transverse direction, on the basis of the thickness profile at the predetermined measurement point that has been inputted from the thickness profile measurement unit; to take, as the both ends in the transverse direction, a distance $X_{e1}$ corresponding to a thickness threshold $Y_t$ determined from the approximating curve of one end-proximal region and a distance $X_{e2}$ corresponding to a thickness threshold $Y_t$ determined from the approximating curve of the other end-proximal region on the basis of the approximating curves obtained for the end-proximal regions of the both ends in the transverse direction and a thickness threshold $Y_t$ from the reference point $Y_0$ that has been set in advance; and to calculate an absolute value of a difference between $X_{e1}$ and $X_{e2}$, that is, $X_{e1}-X_{e2}$, as a width of the coated film in the transverse direction at the predetermined measurement point. With such an inspection device, the above-described method for inspecting the width of a coating film can be advantageously realized.

In the preferred mode of the device disclosed herein, a roller is provided for conveying the elongated sheet-like substrate on which the coating film is formed along the longitudinal direction. In this case, the thickness profile measurement unit may be disposed so as to measure the thickness profile at a predetermined measurement point on a path in which the substrate is conveyed with the roller. In this case, it is preferred that a surface of the roller that is in contact with the sheet-like substrate be set to the reference point $Y_0$ relating to the thickness.

Further, the thickness profile measurement unit may be configured to measure the thickness profile when the coated film formed on the substrate is in a wet state prior to drying. The profile measurement unit may be a laser displacement sensor that performs irradiation with a laser along the transverse direction of the coated film at the predetermined measurement point. In such a case, the measurement of the thickness profile can be performed in a contactless manner.

BEST MODE FOR CARRYING OUT THE INVENTION

The embodiments of the present invention will be described below with reference to the appended drawings. In the drawings, members and parts performing same operations will be assigned with same reference numerals. The present invention is not limited to the below-described embodiments. Dimensional relationships in the figures (length, width, thickness, etc.) do not reflect the actual dimensional relationships.

Embodiment 1

A coated film forming device 100 that is used in the method for inspecting the width of a coated film in the present embodiment will be explained below with reference to FIG. 1. The coated film forming device 100 is provided with a roller 30, a coating unit 50, and a device (coated film width inspection device) 40 that detects the width of the coated film.

Figure 1:
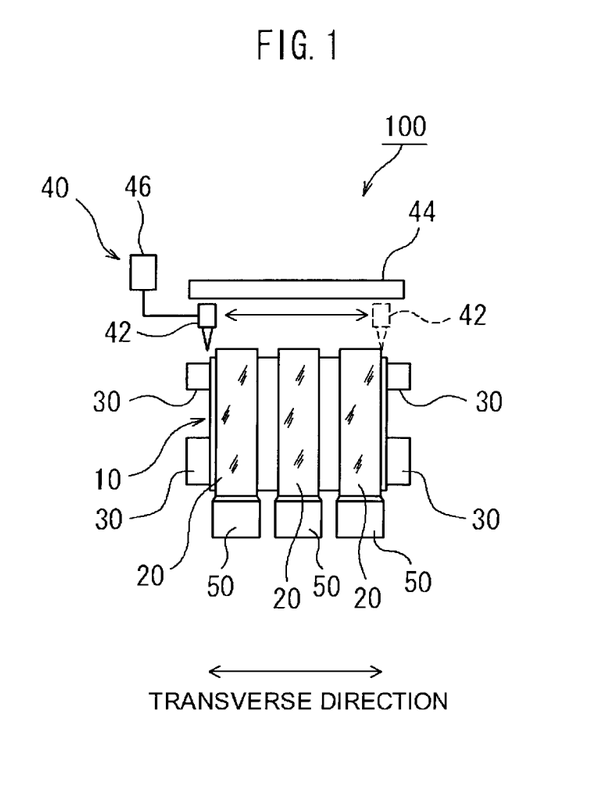
FIG. 1 is an external schematic view illustrating schematically the configuration of the coated film forming device of one embodiment of the present invention.

As shown in FIG. 1, the roller 30 is a device that conveys an elongated sheet-like substrate 10 in the longitudinal direction. In the present embodiment, the elongated sheet-like substrate 10 is successively transferred to a plurality of rollers 30 and a constant tension is applied to the elongated sheet-like substrate 10. Some rollers 30 are provided with drive devices that rotate the rollers. In the coated film forming device 100, the elongated sheet-like substrate 10 is conveyed by unidirectionally rotating the rollers 30.

The coating unit 50 is a device that forms a coated film 20 on the elongated sheet-like substrate 10 along the longitudinal direction of the substrate. In the present embodiment, the coating unit 50 is provided with a die 50 having a slit hole for ejecting a material (in this case, wet-like coating liquid) that forms the coated film 20 and a coating liquid supply unit (not shown in the figure) that supplies the coating liquid to the die 50 under a predetermined pressure. The die 50 is disposed to face the surface of the sheet-like substrate 10 that is conveyed by the rollers 30, ejects the coating liquid onto the surface of the substrate 10, and forms the coated film 20. In the present embodiment, a total of three dies 50 are provided with a predetermined spacing in the transverse direction that intersects the longitudinal direction of the sheet-like substrate 10, and three coated films 20 are formed in the longitudinal direction of the sheet-like substrate 10 on the path in which the substrate is conveyed with the roller 30.

The coated film width inspection device 40 is a device that measures the coating width of the coated film 20 formed in the above-described manner. Specifically, the coated film width inspection device 40 detects a width of the coated film 20 that is formed on the elongated sheet-like substrate 10 along the longitudinal direction of the substrate 10, the width being detected in a transverse direction intersecting this longitudinal direction. More specifically, the coated film width inspection device 40 is provided with a thickness profile measurement unit 42 that measures a thickness profile in the transverse direction of the coated film 20 at a predetermined measurement point in the longitudinal direction of the sheet-like substrate 10 and a control unit 46 electrically connected to the thickness profile measurement unit 42.

In the present embodiment, the thickness profile measurement unit 42 is a laser displacement sensor that emits a laser beam along the transverse direction of the coated film 20 at the predetermined measurement point. The laser displacement sensor 42 irradiates the surface of the substrate 10 with a laser beam and measures a thickness profile of the substrate 10 in the thickness (cross section) perpendicular to the surface of the substrate 10. The laser displacement sensor 42 is attached to a scanning mechanism 44 arranged parallel to the transverse direction of the sheet-like substrate 10 and scanned in the transverse direction of the sheet-like substrate 10 by the scanning mechanism 44. Further, the laser displacement sensor 42 is configured to measure the thickness profile of the sheet-like substrate 10 at the predetermined measurement point on the path in which the substrate is conveyed with the rollers 30.

The control unit 46 is electrically connected to the laser displacement sensor 42 and the scanning mechanism 44. The control unit 46 drives the scanning mechanism 44 and measures the thickness profile of the sheet-like substrate 10 with a constant pitch, while moving the laser displacement sensor 42 in the transverse direction of the sheet-like substrate 10. The measurements with the laser displacement sensor 42 are performed over the entire width of the sheet-like substrate 10. As a result, the thickness profile of the coated film 20 formed on the substrate 10 can be measured along the transverse direction of the substrate 10. In the present embodiment, the control unit 46 measures the thickness profile with the laser displacement sensor 42 in a wet state prior to drying the coated film 20 formed on the substrate 10.

Figure 2:
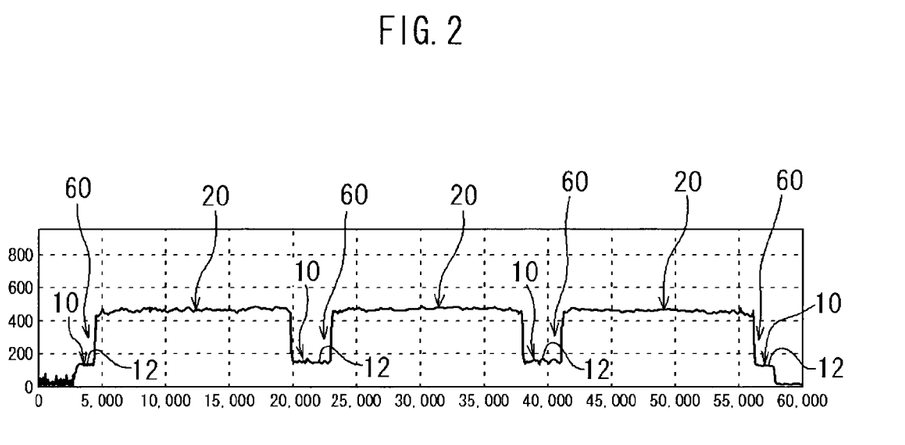
FIG. 2 illustrates measurement results of a thickness profile of one embodiment of the present invention.
Figure 3:
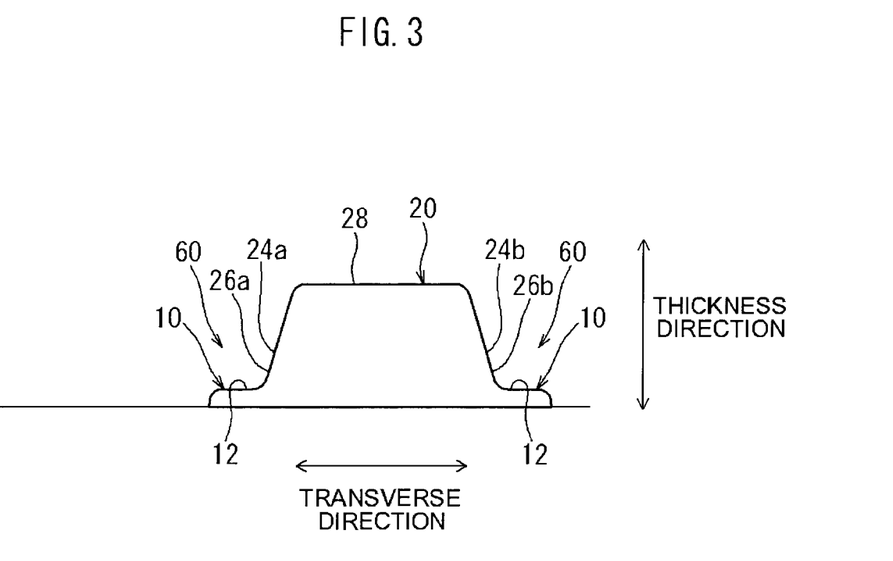
FIG. 3 illustrates a principal portion of the measurement results of a thickness profile of one embodiment of the present invention.

FIG. 2 and FIG. 3 show examples of thickness profiles that have thus been measured. Referring to FIG. 2, three coated films 20 are formed parallel to each other with a predetermined spacing on the surface 12 of the substantially flat substrate 10, and uncoated portions (portions where the surface 12 of the substrate 10 is exposed) 60 where the coated film 20 has not been formed are formed between the coated films 20 and at both end portions in the transverse direction of the substrate 10.

The thickness profile is measured when the coated films formed on the substrate 10 are in a wet state, that is, prior to drying. Therefore, a coating liquid drip occurs in the boundary portions of the coated films 20 and uncoated portions 60. For example, the thickness profile of the coated film 20 assumes a substantially trapezoidal shape, for example as shown in FIG. 3, and the thickness in both end-proximal regions 24a, 24b in the transverse direction of the coated film 20 becomes less than that in the central portion 28 in the transverse direction. In portions of both end-proximal regions 24a, 24b in the transverse direction of the coated film 20 which are thus thinner than the central portion 28, the coating weight per unit surface area (coating amount) decreases. As a result, the unsuitable coated portions 26a, 26b in which the necessary coating weight is not attained can be obtained.

In the present embodiment, the control unit 46 is configured to compute the thickness profile of the coated film 20 in which the thickness in the transverse direction has thus become uneven as shown in FIG. 3, subtract the unsuitable coated portions 26a, 26b in which the desirable coating weight is not obtained, and calculate the width in the transverse direction, taking the coating weight into account. The calculation of width in the transverse direction taking the coating weight into account may be conducted in the following manner.

Figure 4:
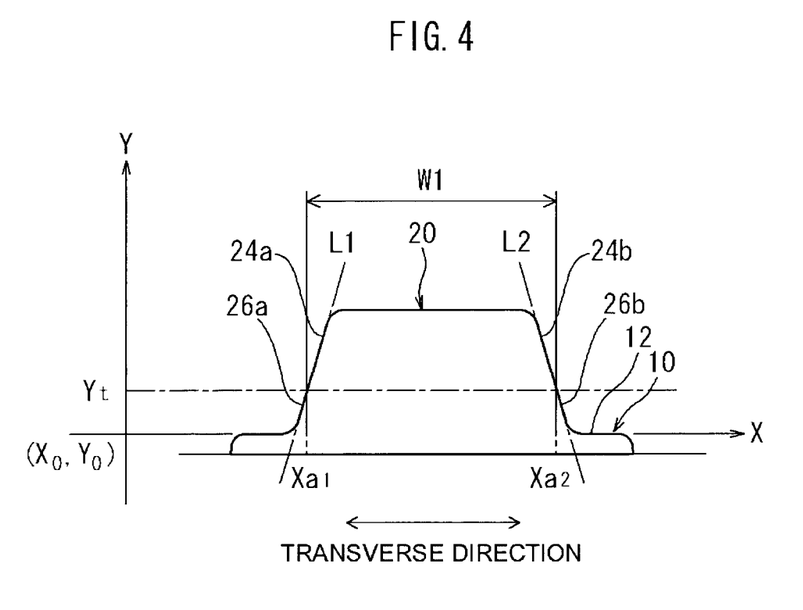
FIG. 4 illustrates a width calculation method for the coated film of one embodiment of the present invention.

As shown in FIG. 4, the measured thickness profile is defined as a thickness Y of the coating film from a reference point $Y_0$ relating to the thickness, with respect to a distance X in the transverse direction from a reference point $X_0$ relating to the width. In the present embodiment, the surface 12 of the sheet-like substrate 10 where the coated film 20 is formed is set to the reference point $X_0$ relating to the width, and the reference point $Y_0$ relating to the thickness. Thus, any point corresponding to the surface 12 of the sheet-like substrate 10 is set as $(X_0, Y_0)$ on the basis of the measured thickness profile.

First, the control unit 46 generates approximating curves of the function of the distance X and thickness Y in end-proximal regions 24a, 24b at respective ends in the transverse direction of the coated film 20 on the basis of the thickness profile at the predetermined measurement point inputted from the thickness profile measurement unit (laser displacement laser) 42. More specifically, it is possible to measure coordinates of distance X and thickness Y for each point of one end-proximal region 24a and find an approximating line L1 by performing linear approximation by applying the linear regression analysis method (typically, a least square method) to the obtained coordinates of distance X and thickness Y of each point. Further, it is possible to measure coordinates of distance X and thickness Y for each point of the other end-proximal region 24b and find an approximating line L2 by performing linear approximation by applying the linear regression analysis method (typically, a least square method) to the obtained coordinates of distance X and thickness Y of each point.

Then, the control unit 46 takes, as the both ends in the transverse direction, a distance $X_{e1}$ corresponding to a thickness threshold $Y_t$ determined from the approximating curve L1 of one end-proximal region 24a and a distance $X_{e2}$ corresponding to a thickness threshold $Y_t$ determined from the approximating curve L2 of the other end-proximal region 24b on the basis of the approximating curves L1, L2 obtained for the end-proximal regions 24a, 24b of the both ends in the transverse direction and the thickness threshold $Y_t$ from the reference point $Y_0$ that has been set in advance, and calculates an absolute value of the difference between $X_{e1}$ and $X_{e2}$, that is, $X_{e1}-X_{e2}$, as a width W1 in the transverse direction of the coated film 20 at the predetermined measurement point.

With such a method, when detecting a width of the coated film 20 in a transverse direction intersecting the longitudinal direction of the elongated sheet-like substrate 10 on which the coated film is formed along the longitudinal direction of the substrate 10, the width W1 of the coated film 20 in the transverse direction can be calculated by subtracting the unsuitable coated portions 26a, 26b in which the desired coating weight is not obtained for the end-proximal regions 24a, 24b of the both ends in the transverse direction. Therefore, the width of the coated film 20 in the transverse direction taking the coating weight into account can be obtained. As a result, a shape value of the coated width of the coated film 20 can be advantageously used, for example, for quality control or coating process estimation of the coating film.

The control unit 46 is electrically connected to a storage unit (not shown in the figure). The control unit 46 executes the above-described width calculation processing according to a width calculation processing program stored in the storage unit. The thickness threshold $Y_t$ from the reference point $Y_0$ may be stored in advance in the storage unit connected to the control unit 46.

In this case the control unit 46 may be configured to create approximating curves L1, L2 of a function of the distance X and the thickness Y in the end-proximal regions 24a, 24b of the both ends in the transverse direction of the coated film 20 on the basis of the thickness profile inputted from the thickness profile measurement unit. Further, the control unit 46 may be configured to take, as the both ends in the transverse direction, a distance $X_{e1}$ corresponding to a thickness threshold $Y_t$ determined from the approximating curve L1 of one end-proximal region 24a and a distance $X_{e2}$ corresponding to a thickness threshold $Y_t$ determined from the approximating curve L2 of the other end-proximal region 24b on the basis of the approximating curves L1, L2 obtained for the end-proximal regions 24a, 24b of the both ends in the transverse direction and the thickness threshold $Y_t$ that has been stored in the storage unit, and calculate an absolute value of the difference between $X_{e1}$ and $X_{e2}$, that is, $X_{e1}-X_{e2}$, as a width W1 of the coated film 20 in the transverse direction at the predetermined measurement point. The obtained width W1 of the coated film 20 in the transverse direction can be stored, as necessary, in the storage unit.

Embodiment 2

Figure 5:
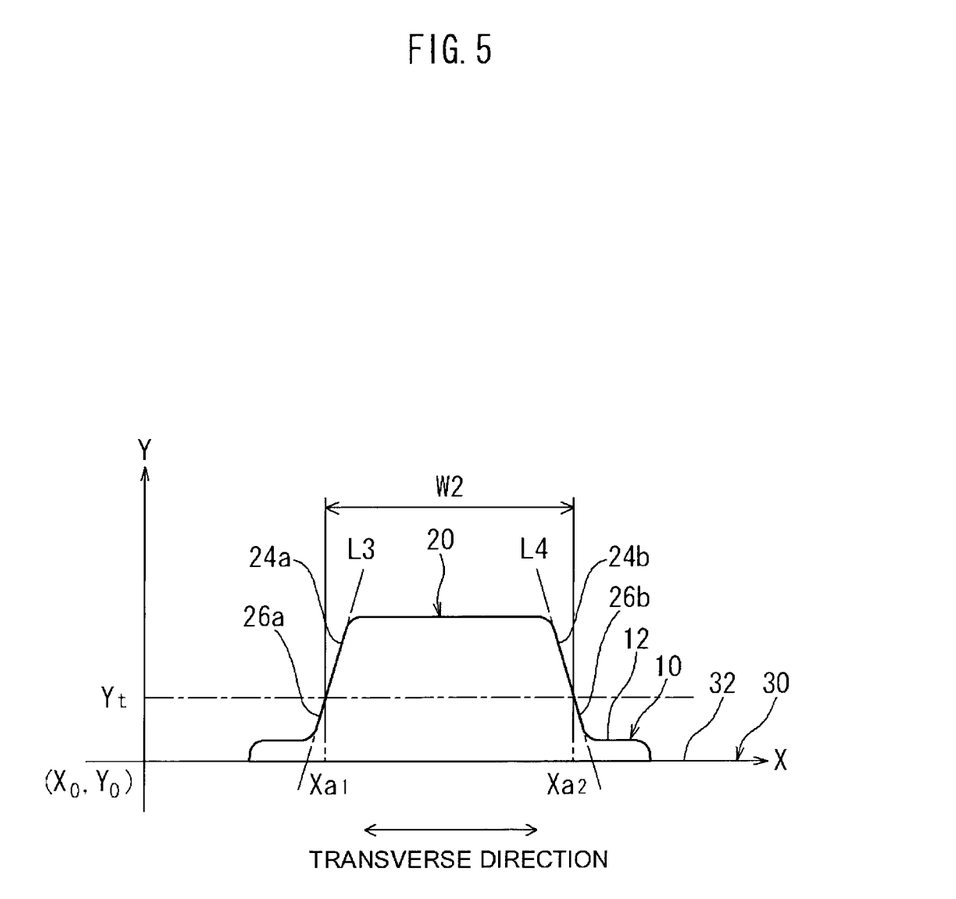
FIG. 5 illustrates a width calculation method for the coated film of one embodiment of the present invention.

The present embodiment has a configuration generally similar to that of the device for examining the width of a coated film of Embodiment 1, but the difference from the above-described Embodiment 1 is that a surface 32 of the roller 30 that is in contact with the sheet-like substrate 10 is set to the reference point $Y_0$ relating to the thickness. Thus, in the present embodiment, as shown in FIG. 5, any point corresponding to the surface 32 of the roller 30 is set as a reference point $(X_0, Y_0)$ on the basis of the measured thickness profile.

In this case, the control unit 46 may be configured to take, as the both ends in the transverse direction, a distance $X_{e1}$ corresponding to a thickness threshold $Y_t$ determined from an approximating curve L3 of one end-proximal region 24a and a distance $X_{e2}$ corresponding to a thickness threshold $Y_t$ determined from an approximating curve L4 of the other end-proximal region 24b on the basis of the approximating curves L1, L2 obtained for the end-proximal regions 24a, 24b of the both ends in the transverse direction and the thickness threshold $Y_t$ from the reference point $Y_0$ such that the surface 32 of the roller 30 that is in contact with the sheet-like substrate 10 is taken as the reference point $Y_0$ relating to the thickness, and calculate an absolute value of the difference between $X_{e1}$ and $X_{e2}$, that is, $X_{e1}-X_{e2}$, as a width W2 of the coated film 20 in the transverse direction at the predetermined measurement point.

Where the surface 12 of the sheet-like substrate 10 is set to the reference point $Y_0$ relating to the thickness, when the sheet-like substrate 10 is formed from a material that can be easily wrinkled, such as an aluminum foil, the reference for width measurements changes according to the difference in the wrinkling state of the surface of the substrate 10. For this reason, a spread can occur among the width calculation results. To solve this problem, in the above-described configuration, the surface 32 of the roller 30 that changes little in position during measurements is set to the reference point $Y_0$ relating to the thickness. Therefore, even when wrinkles or twists occur on the surface 12 of the substrate 10, the coated film width W2 can be calculated with good precision (stably) unaffected by the wrinkles or twists.

The preferred embodiments of the present invention are described above, but this description is not limiting, and it goes without saying that various changes can be made.

For example, in the embodiment shown in FIG. 5, the surface 32 of the roll 30 that is in contact with the sheet-like substrate 10 is set to the reference point $Y_0$ relating to the thickness, but such configuration is not limiting and not only the surface 32 of the roller 30, but also any member that changes little in position during measurement can be advantageously set as the reference point $Y_0$ relating to the thickness and even when wrinkles or twists occur on the surface 12 of the substrate 10, the width of the coated film can be calculated with good precision (stably) unaffected by the wrinkles or twists.

Further, in the above-describes examples, the measurement of thickness profile is conducted by using the laser displacement sensor 42, while conducting irradiation with a laser along the transverse direction of the coated film 20 at the predetermined measurement point, but the present invention is not limited to such a configuration. The measurement of thickness profile can be performed by using a measurement device other than the laser displacement sensor 42.

The coated film forming device 100 equipped with the above-described coated film inspection device 40 can be advantageously used for forming a coated film (electrode active material layer) including an electrode active material on a band-like (sheet-like) electrode (can be applied to either of the positive electrode and negative electrode) that is a constituent element of a wound electrode assembly of a battery such as a lithium ion secondary battery. In this case, by using the above-described device for inspecting the width of the coated film, it is possible to measure the width of the electrode active material layer in the transverse direction taking the coating weight (coating amount) into account, and the coating amount of the electrode active material can be advantageously controlled or evaluated.

Figure 6:
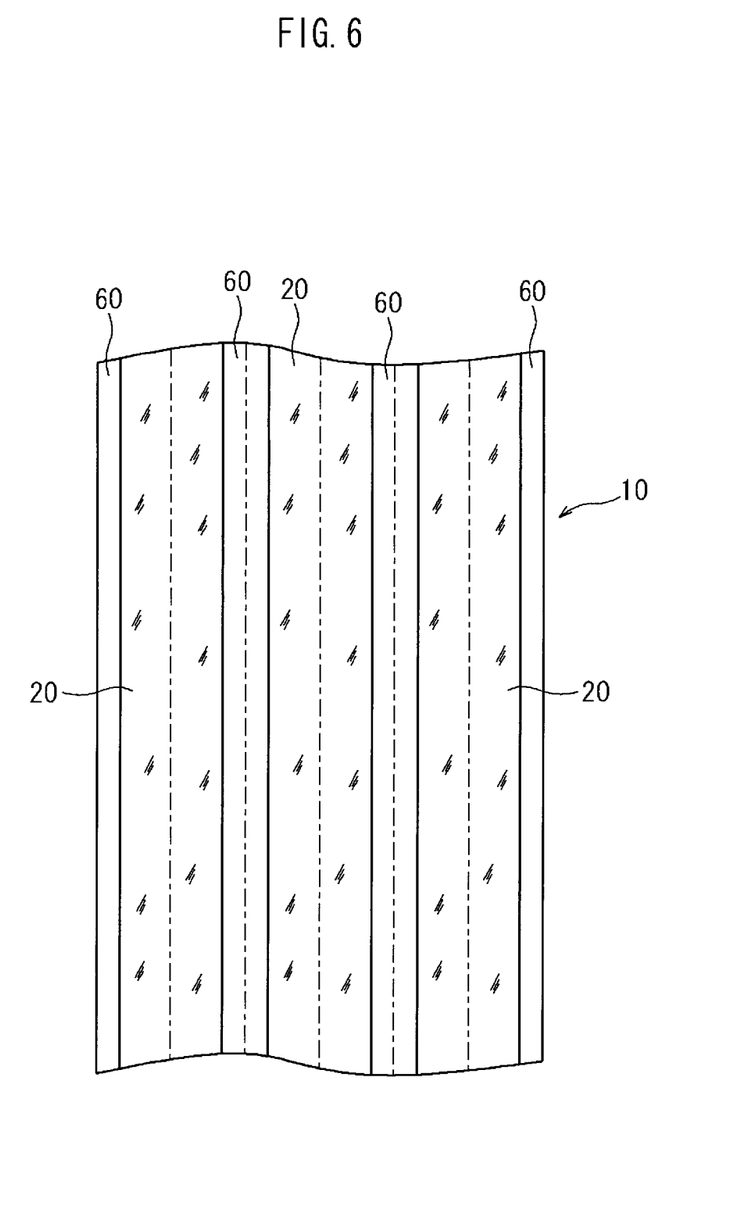
FIG. 6 is a top schematic view illustrating schematically an electrode sheet of another embodiment of the present invention.

For example, in a lithium ion secondary battery, the coating pattern of the coated film (electrode active material layer) 20 can be formed in the form of stripes including an uncoated portion 60 for ensuring an electrode lead (current collecting foil or the like) attachment portion, as shown in FIG. 6. In this case, the thickness in the transverse direction is uneven at the boundary of the electrode active material layer 20 and the uncoated portion 60, and the thickness in both end-proximal regions 24a, 24b in the transverse direction of the electrode active material layer 20 becomes less than that in the central portion 28 in the transverse direction, and the coating amount decreases, as shown in FIG. 2.

Where the device 40 for inspecting the width of a coated film of the present embodiment is used in such a case, the coating width of the electrode active material layer 20 taking the coating weight into account can be calculated by subtracting the unsuitable coated portions in which the desired coating weight is not obtained, and a shape value of the width of the obtained electrode active material layer 20 can be advantageously used, for example, for quality control or coating process estimation of the electrode active material layer 20.

The coated film width measurement device 40 and coated film width measurement method in accordance with the present invention are not limited to the above-described process of fabricating a band-like electrode serving as a constituent element of a wound electrode body of a battery such as lithium secondary battery (more specifically, a process of coating an electrode active material layer on the sheet-like substrate).

INDUSTRIAL APPLICABILITY

The present invention can provide a method for inspecting the width of a coated film that takes the coating weight of the coated film into account. Further, the present invention can provide a device for inspecting the width of a coating film that can advantageously realize such a method for inspecting the width of the coated film.

The invention claimed is:

1. A method for detecting a width of a coated film that is formed on an elongated sheet-like substrate along the longitudinal direction of the substrate, the width being detected in a transverse direction intersecting this longitudinal direction, the method comprising the steps of:
    (a) measuring a thickness profile in the transverse direction of the coated film at a predetermined measurement point in the longitudinal direction, the thickness profile being defined as a thickness Y of the coating film from a reference point $Y_0$ relating to the thickness, with respect to a distance X in the transverse direction from a reference point $X_0$ relating to the width;
    (b) creating approximating curves of a function of the distance X and the thickness Y in end-proximal regions of both ends of the coated film in the transverse direction, on the basis of the measured thickness profile; and
    (c) taking, as the both ends in the transverse direction, a distance $X_{e1}$ corresponding to a thickness threshold $Y_t$ determined from the approximating curve of one end-proximal region and a distance $X_{e2}$ corresponding to said thickness threshold $Y_t$ determined from the approximating curve of the other end-proximal region on the basis of the approximating curves obtained for the end-proximal regions of the both ends in the transverse direction and said thickness threshold $Y_t$ from the reference point $Y_0$ that has been set in advance, and calculating an absolute value of a difference between $X_{e1}$ and $X_{e2}$, that is, $X_{e1}-X_{e2}$, as a width of the coated film in the transverse direction at the predetermined measurement point.

2. The method according to claim 1, wherein the thickness profile is measured at a predetermined measurement point on a path in which the elongated sheet-like substrate on which the coated film is formed along the longitudinal direction is conveyed with a predetermined roller, and a surface of the roller that is in contact with the sheet-like substrate is set to the reference point $Y_0$ relating to the thickness.

3. The method according to claim 1, wherein the measurement of the thickness profile is performed when the coated film formed on the substrate is in a wet state prior to drying.

4. The method according to claim 1, wherein the measurement of the thickness profile is performed using a laser displacement sensor, while conducting irradiation with a laser along the transverse direction of the coated film at the predetermined measurement point.

5. A device for detecting a width of a coated film that is formed on an elongated sheet-like substrate along the longitudinal direction of the substrate, the width being detected in a transverse direction intersecting this longitudinal direction, the device comprising:
    a thickness profile measurement unit that measures a thickness profile in the transverse direction of the coated film at a predetermined measurement point in the longitudinal direction, the thickness profile being defined as a thickness Y of the coating film from a reference point $Y_0$ relating to the thickness, with respect to a distance X in the transverse direction from a reference point $X_0$ relating to the width; and
    a control unit connected to the thickness profile measurement unit, wherein
    the control unit is configured: to create approximating curves of a function of the distance X and the thickness Y in end-proximal regions of both ends of the coated film in the transverse direction, on the basis of the thickness profile at the predetermined measurement point that has been inputted from the thickness profile measurement unit; to take, as the both ends in the transverse direction, a distance $X_{e1}$ corresponding to a thickness threshold $Y_t$ determined from the approximating curve of one end-proximal region and a distance $X_{e2}$ corresponding to said thickness threshold $Y_t$ determined from the approximating curve of the other end-proximal region on the basis of the approximating curves obtained for the end-proximal regions of the both ends in the transverse direction and said thickness threshold $Y_t$ from the reference point $Y_0$ that has been set in advance; and to calculate an absolute value of a difference between $X_{e1}$ and $X_{e2}$, that is, $X_{e1}-X_{e2}$, as a width of the coated film in the transverse direction at the predetermined measurement point.

6. The device according to claim 5, further comprising:
    a roller that conveys the elongated sheet-like substrate on which the coating film is formed along the longitudinal direction, wherein
    the thickness profile measurement unit is disposed so as to measure the thickness profile at a predetermined measurement point on a path in which the substrate is conveyed with the roller, and
    a surface of the roller that is in contact with the sheet-like substrate is set to the reference point $Y_0$ relating to the thickness.

7. The device according to claim 5, wherein the thickness profile measurement unit measures the thickness profile when the coated film formed on the substrate is in a wet state prior to drying.

8. The device according to claim 5, wherein the profile measurement unit is a laser displacement sensor that performs irradiation with a laser along the transverse direction of the coated film at the predetermined measurement point.

* * * * *